United States Patent Office 3,787,374
Patented Jan. 22, 1974

3,787,374
PROCESS FOR PREPARING HIGH MOLECULAR WEIGHT CARBOXYLIC COMPOSITIONS
Charles Wesley Adams, Painesville, Ohio, assignor to The Lubrizol Corporation, Wickliffe, Ohio
No Drawing. Continuation-in-part of abandoned application Ser. No. 30,991, Apr. 22, 1970. This application Sept. 7, 1971, Ser. No. 178,503
Int. Cl. C08f 27/00
U.S. Cl. 260—78.4 D                 34 Claims

ABSTRACT OF THE DISCLOSURE

This invention relates to a process and the products obtained therefrom for preparing a high molecular weight substantially saturated, hydrocarbon-substituted carboxylic composition and more specifically to an oil soluble carboxylic composition obtained by reacting at least one halogenated substantially-saturated hydrocarbon having at least 25 aliphatic carbon atoms per molecule with an effective amount of at least one low molecular weight, alpha or beta halogenated saturated-aliphatic carboxylic acid or a derivative thereof. The carboxylic compositions of this invention are particularly useful as additives, e.g., dispersants, etc. in various oleaginous materials including, for example, lubricating oils, hydraulic fluids, fuels, etc.

This application is a continuation-in-part of copending application Ser. No. 30,991 filed on Apr. 22, 1970, now abandoned.

This invention is directed to a process and to the products obtained therefrom for preparing a high molecular weight substantially saturated, hydrocarbon-substituted carboxylic composition which is particularly useful as an additive in various oleaginous materials including, for example, lubricating oils, fuels, e.g., gasoline, diesel fuels, etc., hydraulic fluid and the like. More specifically, this invention relates to a process for preparing an oil-soluble, high molecular weight carboxylic composition particularly useful in an effective amount in lubricants and fuels. The high molecular weight substantially saturated, hydrocarbon-substituted carboxylic composition of this invention is obtained by reacting at least one halogenated, substantially-saturated hydrocarbon having at least 25 aliphatic carbon atoms per molecule, e.g., a halogenated polyisobutylene with at least about 1.0 chemical equivalent of at least one low molecular weight, alpha, or beta halogenated-saturated aliphatic carboxylic acid or a derivative thereof.

The oil soluble high molecular weight substantially saturated, hydrocarbon-substituted carboxylic composition of this invention includes the high molecular weight carboxylic acids, the anhydrides and the derivatives thereof such as the esters, salts, halides, amides, amides, and amidines. These high molecular weight carboxylic compositions may be used either alone or in combination, e.g., as dispersants, with other well-known additives, including, for example, detergants, extreme-pressure agents, dispersants, oxidation inhibitors, VI improving agents, rust inhibitors, etc., in small but effective amounts in various oleaginous materials.

Presently, various oil soluble dispersants, detergents and the like are being used in lubricants and fuels for power-transmitting units, gears, internal combustion engines, etc. While these additives have achieved wide-spread acceptance there is still need for additives which inhibit the deterioration and improve the general characteristics of the oils and fuels particularly when used in an internal combustion engine. It is the deterioration of a motor oil, for example, during the operation of the engine that causes the formation of sludge, varnish, etc., which obstructs the movement of the metal parts and thereby causes a malfunctioning and premature breakdown of the engine. Although there are many additives that are effective, there is still a need to improve their overall characteristics and to provide a multi-purpose additive which may be used, e.g., as a dispersant, in both fuels and lubricants.

Accordingly, it is an object of this invention to provide a high molecular weight substantially saturated, hydrocarbon-substituted carboxylic composition, e.g., a high molecular weight acylated-nitrogen compound and a process for preparing same which may be used as an additive in various oleaginous materials. It is another object of this invention to provide a novel process for preparing said high molecular weight carboxylic composition and the products obtained therefrom. It is a further obejct of this invention to provide an oil-soluble, high molecular weight substantially saturated, hydrocarbon-substituted carboxylic composition, i.e., a carboxylic acid or its derivative, which may be used as an acylating agent for preparing the corresponding salts, esters, imides, amides, amidines, etc., as additives for oleaginous materials. It is still a further object of this invention to provide a process and the products obtained therefrom for preparing a high molecular weight substantially saturated, hydrocarbon-substituted carboxylic composition particularly useful as an additive, e.g., dispersant, for motor oils and fuels.

These and other objects of the invention are accomplished by providing a process for preparing a high molecular weight substantially saturated, hydrocarbon-substituted carboxylic composition which comprises reacting (A) at least one halogenated, substantially-saturated hydrocarbon, e.g., a chlorinated polyisobutylene having at least 25 aliphatic carbon atoms; and wherein said halogen is present in an amount of at least about 1.0 atomic proportion of halogen per molecule to about 1.0 atomic proportion of halogen for about every 25 aliphatic carbon atoms in said hydrocarbon molecule with (B) at least one comparatively low molecular weight, alpha or beta-halogenated saturated-aliphatic carboxylic acid or a derivative of said acid having up to 12 carbon atoms in the acyl moiety. The derivatives of said carboxylic acid being selected from the class consisting of the anhydrides, halides, esters, salts, amides, imides, amidines and various combinations thereof.

The halogenated substantially-saturated hydrocarbon contains an average of at least about 25 aliphatic carbon atoms and preferably an average of at least about 50 carbon atoms. The term "substantially" is used herein to particularly point out that the aliphatic chain is substantially a saturated-aliphatic hydrocarbon which may contain a small number of pendant aromatic groups, e.g., phenyl or substituted phenyl groups in an amount of about one aromatic group for about every 25 aliphatic carbon atoms. Moreover, while the halogenated substantially-saturated aliphatic hydrocarbons are substantially free from aromatic substituents, they may, however, contain a small amount of various polar substituents, including, for example, nitro, alkoxy, keto, hydroxy, ethereal, aldehydo, mercapto, etc. The presence of these polar groups, i.e., other than the halogen groups should not constitute more than about 10% by weight of the total weight of the halogenated substantially saturated-aliphatic hydrocarbon and preferably said hydrocarbon may not contain a polar group other than said halogen groups.

More specifically, the halogenated substantially-aliphatic hydrocarbon contains an average of at least about 1.0 halogen group per molecule, e.g., at least about one atomic proportion of halogen for each molecule of polyisobutylene and as many as about 1.0 atomic proportion of halogen for every 25 aliphatic carbon atoms and preferably for every 50 aliphatic carbon atoms present in the hydrocarbon. The halogen groups may include, for example, the chloro, bromo, fluoro, iodo and various combinations thereof. However, the preferred halogens are the chloro and bromo groups. The source of the halogenated substantially saturated-aliphatic hydrocarbon is not critical and therefore may be obtained by any of the known methods. These halogenated aliphatic hydrocarbons are well-known in the art and may be obtained, for example, by reacting a halogen, e.g., chlorine, etc. with an olefin polymer at temperatures ranging up to about 140° C. or higher until the halogen content is sufficient to provide an average of at least about 1.0 atomic proportion of halogen per molecule of polyolefin and up to an average of about 1.0 atomic proportion of halogen for about every 25 aliphatic carbon atoms in the polymer.

The olefin polymers which are particularly useful in preparing the halogenated hydrocarbon for purposes of this invention, e.g., the chlorinated and brominated hydrocarbons are the monoolefins which have from about 2 to 30 carbon atoms. More specifically, these polymers, i.e., the copolymers, terpolymers, etc., may include the monoolefins such as ethylene, propene, 1-butene, isobutene, 1-hexane, 1-octene, 2-methyl-1-heptene, 3-cyclohexyl-1-butene, 2-methyl-5-propyl-1-hexene, etc. In addition, polymers of olefins wherein the olefinic linkage is not in the terminal position are likewise useful and may include, for example, 2-butene, 3-pentene, 4-octene, etc. Further, interpolymers of said monoolefins may be used which include, for example, the monoolefins illustrated above with other interpolymerizable olefinic compounds such as the aromatic olefins, cyclic olefins, polyolefins, etc. More specifically, the interpolymers may be prepared, for example, by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene, etc.

The relative proportion of the monoolefins and the other monomers used in preparing the polymers influence the stability and oil solubility of the carboxylic composition of this invention and therefore said polymers should be substantially aliphatic and substantially saturated. More particularly for purposes of this invention, it is preferred that the polymers contain at least about 95% by weight of saturated units derived from the aliphatic monoolefins and no more than about 5% by weight of the olefinic linkages based on the total carbon-to-carbon covalent linkages in the hydrocarbon substituent. In a more preferred embodiment, the percent of olefinic linkages may be less than about 2% by weight of the total carbon-to-carbon covalent linkages in said substantially-saturated hydrocarbon. Specific examples of these polymers may include, for example, a copolymer of 95% by weight of isobutene with 5% by weight of styrene; a terpolymer of 98% by weight of isobutene with 1% by weight of piperylene and 1% by weight of chloroprene; a terpolymer of 95% by weight of isobutene with 2% by weight of 1-butene and 3% by weight of 1-hexene; a terpolymer of 60% by weight of isobutene with 20% by weight of 1-pentene and 20% by weight of 1-octene; a copolymer of 80% by weight of 1-hexene and 20% by weight of 1-heptene; a terpolymer of 90% by weight of isobutene with 2% by weight of cyclohexene and 8% by weight of propene; a copolymer of 80% by weight of ethylene and 20% by weight of propene; etc. Another source of hydrocarbon which may be used to prepare the halogenated substantially saturated hydrocarbon-substituents include the saturated aliphatic hydrocarbons, e.g., highly refined, high molecular weight white oils or the synthetic alkanes including those obtained by hydrogenating high molecular weight olefin polymers.

Of the various polymers which may be used, the particularly preferred include the halogenated aliphatic hydrocarbons obtained by halogenating polyisobutylene, polypropylene, polyethylene, and copolymers of ethylene and propylene. These polymers may have average molecular weights ranging from about 300 to 10,000 and preferably from about 700 to 5000. The preferred chlorinated or brominated polymers may be prepared, for example, by reacting the olefin with chlorine and/or bromine, at a temperature and for a period sufficient to obtain a product of the required chlorine and/or bromine content. The reaction between the polymer and the halogen may be carried out, if desired, in the presence of a solvent, including, for example, carbon tetrachloride, chloroform, chlorobenzene, etc. As indicated, the method by which the halogen is incorporated into the polymer, e.g., olefin polymer, is not critical and therefore any available method is sufficient and the products obtained therefrom may be used for purposes of this invention.

The low molecular weight, alpha or beta-halogenated saturated-aliphatic carboxylic acid or its derivative which may be used for preparing the high molecular weight carboxylic composition of this invention include, for example, the carboxylic acids and the derivatives which contain at least about one halogen atom, e.g., chloro or bromo group in the alpha or beta position relative to the carboxyl group, i.e., the acid, anhydride, salt, ester, halides, amide, imide, amidine, etc. The saturated aliphatic carboxylic acid or a derivative thereof may contain up to 12 carbon atoms in the acyl moiety and one or more halogen atoms, e.g., chloro and/or bromo groups, in both the alpha and/or beta position relative to said carboxyl groups.

Specific examples of the various low molecular weight, halogenated-saturated carboxylic acids or the derivatives which may be used for purposes of this invention include 2-chloro-propanoic acid; 3-chloropropanoic acid; 3-chloro-2,2-dimethyl-propanoic acid; 3-chloro-propanoic acid; 3-chloro-2,2-dimethyl-propanoic acid; 3-chloro-2-methyl propanoic acid; 2,3-dichloropropanoic acid; 3,3-dichloropropanoic acid; 3,3-dichloro-2-hydroxy - 2 - methylpropanoic acid; 2,2,3-trichloropropanoic acid; bromosuccinic acid; 2,3-dibromosuccinic acid; 2,3-dichlorosuccinic acid; chlorosuccinic acid; chloroethanoic acid; dichloroethanoic acid; 2-bromobutanoic acid; 2-bromo - 2 - ethyl-butanoic acid; 2-bromo-3-methylbutanoic acid; 3 - chlorobutanoic acid; 2-chlorobutanoic acid; 2-chloro-2-methyl-3-oxo butanoic acid; 2,3-dibromobutanoic acid; 2,4 - dibromobutanoic acid; 2,3-dichlorobutanoic acid; 2,2-dichloro-3-oxobutanoic acid; 2,2,3-trichlorobutanoic acid; 2,3,3-trichlorobutanoic acid; 2-bromodecanoic acid; 2-chloroheptanoic acid; chloromethylmalonic acid, bromomalonic acid, chloromalonic acid; 2-bromooctanoic acid; 2-chloropentanoic acid; 3-chloropentanoic acid and the like. In addition to the above-illustrated acids, the derivatives of said carboxylic acids which may be used include the halides, anhydrides, esters, imides, amides, amidines, nitrogen-containing salts, metal salts and various combinations thereof.

More specifically the derivatives of the carboxylic acid or its anhydride includes the acid chlorides, acid bromides, acid iodides, etc. The esters may be derived, for example, from the mono- or polyhydric alcohols and particularly the alcohols having up to about 10 carbon atoms, e.g., the lower alkyl esters derived from monohydric alcohols having up to 7 carbon atoms. These include, for example, methanol, ethanol, propanol, isopropanol, butanol, isobutanol, tertiary butanol, pentanol, hexanol, heptanol, etc. The acylated-nitrogen derivatives include the amides, imides, amidines and combinations thereof obtained by reacting the carboxylic acid, its anhydride or acid halides, etc., with ammonia or an amine including, for example, N-(lower alkyl) amines, N,N-di(lower alkyl) amines, analine, alkylene, polyamines, e.g., ethylene polyamine, etc. The metal salt derivatives include especially the salts obtained from the metals of Groups I and II of the Periodic Table including, for example, lithium, sodium, potassium, magnesium, calcium, strontium, barium, zinc, cadmium and combinations thereof.

Examples which illustrate the carboxylic-acid derivatives which may be reacted with the halogenated-aliphatic hydrocarbon includes chlorosuccinic anhydride, chlorosuccinimide, the mono- or diethyl ester of chloromalonic acid, the diamide of chlorosuccinic acid, the metal salts, e.g., sodium salt of 2-bromobutanoic acid, the alkaline earth metal salts, e.g., calcium salt of 3-chlorobutanoic acid, the amides of 3-chloropentanoic acid, the zinc salt of 3-chlorobutanoic acid, the N,N-diethylamide of 2,3-dichlorobutanoic acid and the like. Of the various carboxylic-acids and the derivatives which may be used for purposes of this invention, a preferred class includes the beta-chlorocarboxylic acids and particularly the beta-chloroalkanoic acids having up to 7 carbon atoms and the corresponding acyl chlorides and lower alkyl esters.

The high molecular weight substituted-carboxylic compositions of this invention derived from the low molecular weight carboxylic acids and the derivatives may be used as acylating agents in the preparation of said high molecular weight oil soluble carboxylic acid esters, acylated-nitrogen compounds, etc. These acylated compositions, e.g., the esters and acylated-nitrogen compounds are particularly useful as additives for lubricating oils and fuels. In preparing the high molecular weight substantially-saturated, hydrocarbon-substituted carboxylic compositions the reactants are in contact or reacted at temperatures of at least about 80° C. More specifically, at least one halogenated substantially-aliphatic hydrocarbon is contacted and reacted with at least one low molecular weight alpha or beta halogenated saturated-aliphatic carboxylic acid or its derivative, e.g., chlorinated propanoic acid, for a period sufficient for at least a portion of said halogenated hydrocarbon to add to the carboxylic acid or its derivative. As indicated, the reaction temperature may range from about 80° C. up to about the decomposition temperature of either of the reactants or the product obtained therefrom. Preferably the temperature ranges from about 100° C. to 300° C. and more preferably at temperatures ranging from about 175° C. to about 225° C.

In preparing the high molecular weight oil soluble carboxylic compositions, at least about 1.0 chemical equivalent of the low molecular weight alpha or beta halogenated saturated-aliphatic carboxylic acid or its derivative is reacted with each chemical equivalent of the halogenated substantially-saturated hydrocarbon. While there is no criticality as to the exact amount of carboxylic acid or its derivative that may be employed, it is preferable to react at least about 1.0 chemical equivalent and up to about 6.0 equivalents of said carboxylic acid or its derivative for each atomic proportion of halogen, e.g., chloro and/or bromo, etc., present in each mole of said halogenated hydrocarbon. Moreover, it is important that said halogenated hydrocarbon have at least about 25 aliphatic carbon atoms per molecule and at least 1.0 atom of halogen for every 25 aliphatic carbon atoms in said hydrocarbon. Thus, the equivalent weight of the low molecular weight carboxylic acid and its derivatives, for purposes of this invention, is determined by the number of carboxylic groups, e.g., carboxylic acid groups present in the acid or its derivatives, and the equivalent weight of the halogenated hydrocarbon is determined by the number of halogen atoms present in said hydrocarbon. For example, the calculated equivalent weight of a specific halogenated-aliphatic hydrocarbon, e.g., a chlorinated polyisobutylene having an average molecular weight of about 1500 which contains an average of about 3.0 atoms of chlorine per molecule would be the average molecular weight, i.e., 1500 divided by 3. Generally, it is preferred to react approximately 1.0 calculated chemical equivalent of the low molecular weight carboxylic acid or its derivative with each atomic proportion of halogen, e.g., the chloro and/or bromo groups, present in the substantially saturated aliphatic hydrocarbon. Any unreacted low molecular weight carboxylic acid, etc. may be removed from the reaction product by any of the conventional techniques, e.g., distillation, filtration, etc. If, however, the carboxylic acid, etc. is soluble in the product, it may be allowed to remain in the product. Similarly, unreacted halogenated hydrocarbon, if desired, may be allowed to remain in the product and act as a diluent, etc.

In preparing the high molecular weight carboxylic compositions, the halogenated hydrocarbons and the carboxylic acid or its derivative may be reacted in the presence of an inert solvent. The solvent may include the various liquids normally employed in chemical processes such as the low viscosity mineral lubricating oils, liquid hydrocarbons, halogenated hydrocarbons, e.g., benzene, toluene, xylene, chlorobenzene, heptane, cyclohexane, Stoddard Solvent, petroleum ether, dioxanes and various combinations thereof.

As indicated, the process of this invention is particularly useful for preparing a high molecular weight substantially-saturated, hydrocarbon-substituted carboxylic composition, e.g., a high molecular weight, carboxylic acid, the anhydrides, acid halides, lower alkyl esters, etc., which may be used as an acylating agent for preparing other high molecular weight acylated-nitrogen compounds, esters, salts, etc. For example, the high molecular weight hydrocarbon-substituted carboxylic acids, anhydrides or acyl halides may be reacted with a polyhydric alcohol having up to about 40 aliphatic carbon atoms, e.g., ethylene glycol, propylene glycol, etc., to obtain the corresponding high molecular weight oil soluble esters. These esters have excellent dispersants characteristics and therefore are highly useful in lubricants and fuels. Similarly, the high molecular weight hydrocarbon-substituted carboxylic composition may be used as an acylating agent with various amines to obtain the corresponding oil soluble, acylated-nitrogen compounds which are useful also as an additive for lubricants and fuels. Various methods for preparing oil soluble, high molecular weight carboxylic acid compositions, e.g., the acylated-nitrogen compounds, esters, salts, etc., are known as illustrated, for example, in U.S. Pats. 3,219,666; 3,271,310; 3,272,746; and 3,454,607; the disclosures of which are hereby incorporated by reference.

For example, the high molecular weight oil soluble hydrocarbon-substituted carboxylic compositions of this invention, i.e., the acid, the anhydride, halide, etc., may be reacted with an amine, for example, to obtain the corresponding acylated-nitrogen compounds. The amines may have the structural configuration of

wherein the two remaining valences of the nitrogen atom are satisfied preferably by hydrogen, amino or organic radicals bonded to said nitrogen atoms through direct carbon-to-nitrogen linkages. Thus the compounds from which the acylated-nitrogen group may be derived include ammonia, aliphatic amines, aromatic amines, heterocyclic amines, carbocyclic amines, etc. The amines may be primary or secondary amines and may include the polyamines such as the alkylene amines, arylene amines, cyclic polyamines and the hydroxy-substituted derivatives of these polyamines. More specifically, the amines may include methylamine, N - methylethylamine, N - methyl - octyl-amine, N-cyclohexyl-aniline, dibutylamine, cyclohexyl-amine, aniline, di(p-methylphenyl)amine, dodecylamine, octadecylamine, o-phenylenediamine, N,N'-di-n-butyl-p-phenylenediamine, morpholine, piperazine, tetrahydropyrazine, indole, hexahydro-1,3,5-triazine, melamine, bis-(p-aminophenyl)methane, phenylmethylenimine, methanediamine, cyclohexamine, pyrrolidine, 3-amino-5,6-diphenyl-1,2,4-triazine, quinonediimine, 1,3-indandiimine, 2-octadecylimidazoline, 2-phenyl - 4 - methylimidazolidine, oxazolidine, ethanolamine, diethanolamine, 2-heptyloxazolidine, etc.

A preferred source of the acylated-nitrogen group comprises the polyamines, especially the alkylene polyamines conforming, for the most part, to the formula:

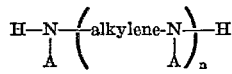

wherein n is an integer preferably less than about 10, A is a substantially hydrocarbon or hydrogen radical, and the alkylene radical is preferably a lower alkylene radical having less than about 8 carbon atoms. The alkylene amines include primarily methylene amines, ethylene amines, butylene amines, propylene amines, pentylene amines, hexylene amines, heptylene amines, octylene amines, other polymethylene amines, and also the cyclic and the higher homologs of these amines such as the piperazines and aminoalkyl-substituted piperazines. They are exemplified specifically by ethylene diamine, triethylene tetramine, propylene diamine, decamethylene diamine, octamethylene diamine, di(heptamethylene)triamine, tripropylene tetramine, tetraethylene, pentamine, trimethylene diamine, pentaethylene hexamine, di(trimethylene)triamine, 2-heptyl13-(2-aminopropyl)imidazoline, 4 - methylimidazoline, 1,3-bis(2 - aminoethyl)imidazoline, pyrimidine, 1 - (2 - aminopropyl)piperazine, 1,4-bis(2 - aminoethyl)piperazine, and 2 - methyl - 1 - (2-aminobutyl)piperazine. Higher homologs obtained by condensing two or more of the above-illustrated alkylene amines likewise are useful. The ethylene amines especially useful are described under the heading "Ethylene Amines" in the "Encyclopedia of Chemical Technology" by Kirk and Othmer, volume 5, pp. 898–905, Interscience Publishers, New York (1950). A particularly useful alkylene amine for reasons of economy as well as effectiveness of the products derived therefrom is a mixture of ethylene amines prepared by the reaction of ethylene chloride and ammonia. This product has a composition corresponding to that of tetraethylene pentamine.

The hydroxyalkyl-substituted alkylene amines, i.e., alkylene amines having one or more hydroxyalkyl substituents on the nitrogen atoms, are also useful. The hydroxyalkyl-substituted alkylene amines are preferably those in which the alkyl group is a lower alkyl group, i.e., having less than about 6 carbon atoms. Examples of these amines include N-(2-hydroxyethyl)ethylene diamine, N,N'-bis(2-hydroxyethyl)ethylene diamine, 1-(2-hydroxyethyl)piperazine, mono - hydroxypropyl - substituted diethylene triamine, 1,4 - bis(2-hydroxypropyl)piperazine, dihydroxypropyl-substituted tetraethylene pentamine, N-(3-hydroxypropyl)tetramethylene diamine, 2-heptadecyl - 1 - (2-hydroxyethyl)imidazoline, etc. Another source of the nitrogen-containing group includes the ureas, thioureas, hydrazines, guanidines, amidines, amides, thioamides, cyanamides, etc. Specific examples illustrating these compounds include hydrazine, phenylhydrazine, N,N'-diphenylhydrazine, octadecylhydrazine, benzoylhydrazine, urea, thiourea, N-butylurea, stearylamide, oleylamide, guanidine, 1,3-diphenylguanidine, 1,2,3-tributylguanidine, benzamidine, octadecamidine, N,N'-dimethylstearamidine, cyanamide, dicyandiamide, guanylurea, aminoguanidine, etc.

The amines and various combinations thereof may be reacted with the high molecular weight oil soluble hydrocarbon-substituted carboxylic acid or its derivative in an amount of at least about 0.001 chemical equivalent of the amine for each 1.0 chemical equivalent of said carboxylic acid or its derivative. Generally, however, the amines may be reacted with the carboxylic acid or its derivative in an amount ranging from about 0.001 to 1.0 mole of the amine per equivalent of said acid or its derivatives, i.e., acid-producing group. Specifically, the amines, i.e., alkylene polyamines, may be present in an amount ranging from about 0.001 to 4.0 and preferably in an amount ranging from about 0.01 to 2.0 and still more preferably in an amount ranging from about 0.1 to 1.0 chemical equivalents of said amine for each chemical equivalent of said carboxylic acid or its derivative.

For purposes of this invention, the equivalent weight of the amine is determined by the number of nitrogen-containing radicals, i.e., amine groups, as defined by the structural configuration

For example, the equivalent weight of a polyalkylene diamine having two amine groups is the molecular weight of said diamine divided by 2. Similarly, the equivalent weight of the carboxylic acid or its derivative is determined by the number of acid or its derivatives, i.e., acid-producing groups as defined by the structural configuration

wherein X may be either a halogen, hydroxy, hydrocarbonoxy or acyloxy radical.

The reaction between the amine and the carboxylic acid or acid-producing group results in the direct attachment of the nitrogen atom to the polar radical derived from the acid or acid-producing group. The linkage formed between the nitrogen atom and the polar radical may be characterized as an amide, imide, amidine, salt or mixtures of these radicals. The reaction, for example, involving a high molecular weight acid or its anhydride with an amine at temperatures below about 50° C. will result predominantly in a salt linkage. However, at relatively higher temperatures, e.g., about 80° C. and up to about 300° C. and higher the results are predominantly an imide, amide or amidine linkage or a mixture thereof. In any event, the products obtained by the process, irrespective of the relative proportions of the various linkages present, are effective for purposes of this invention.

The high molecular weight, substantially hydrocarbon-substituted carboxylic-metal salts of this invention are obtained, for example, by reacting the carboxylic acid or its derivative with a metal or metal compound and particularly from a metal selected from the class consisting of the alkali and alkaline earth metals of Groups I and II of the Periodic Table. In addition, other metals which may be used either alone or in combination include, for example, aluminum, tin, cobalt, nickel, etc. Specific examples of the metal reactant includes lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, nickel carbonate, etc.

The metal salts may be classified as acidic salts, neutral salts or basic salts. The term "acidic salt" includes for example, a succinic acid wherein one of the two carboxylic groups is converted to a salt leaving a free carboxylic-acid group in its molecular structure. The term "neutral salt" includes a succinic acid, for example, wherein both of the carboxylic acid groups are converted to salt groups. A "neutral salt" may be prepared from the reaction of an equivalent of the succinic acid and an equivalent of the metal compound. In some instances, more than the calculated stoichiometric amount of metal may be incorporated into the carboxylic acid to form the basic salt. A "basic salt," therefore, includes a metal salt wherein the metal is present in stoichiometrically greater amounts than the acid radical. In preparing the basic metal salts, it is sometimes advantageous to add to the reaction mixture, in the presence of a promoter, carbon dioxide at temperatures ranging from about 20° C. up to the reflux temperature of the mixture. The promoters include the lower alcohols, e.g., methanol, propanol and the phenolic compounds, e.g., heptylphenol, octyl phenol, etc. The carbonation may not be necessary in preparing basic salts but it is beneficial in that it allows the incorporation of significantly more metal into the product and also has a clarifying effect on both the process mixture and the ultimate product. Methods for preparing the high molecular weight salts are well-known as particularly set forth, for example, in U.S. Pat. 3,271,310; the specification of which is hereby incorporated by reference.

The esters of this invention are obtained from hydroxy compounds which include the aliphatic compounds such as the monohydric and polyhydric alcohols or aromatic compounds, e.g., phenols, naphthols, etc. The aromatic hydroxy compounds from which the esters may be derived are illustrated by the following specific examples, including phenol, beta-naphthol, alpha-naphthol, cresol, resorcinol, catechol, p,p'-dihydroxybiphenyl, 2-chlorophenol, 2,4-dibutylphenol, propene tetramer-substituted phenol, didodecylphenol, 4,4'-methylene-bis-phenol, alpha-decyl-beta-naphthol, polyisobutene(molecular weight of 1000)-substituted phenol, the condensation product of heptylphenol with 0.5 mole of formaldehyde, the condensation product of octylphenol with acetone, di(hydroxyphenyl)oxide, di(hydroxyphenyl)sulfide, di(hydroxyphenyl)disulfide, and 4-cyclohexyl-phenol, etc. The phenols and alkylated phenols having up to three alkyl substituents are preferred. These alkyl substituents may contain 100 or more carbon atoms.

The alcohols from which the esters may be derived preferably contain up to about 40 aliphatic carbon atoms. They include the monohydric alcohols such as methanols, ethanol, isooctanol, dodecanol, cyclohexanol, cyclopentanol, behenyl alcohol, hexatriacontanol, neopentyl alcohol, isobutyl alcohol, benzyl alcohol, beta-phenylethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, mono-oleate of ethylene glycol, monostearate of diethylene glycol, sec-pentyl alcohol, tert-butylalcohol, 5-bromo-dodecanol, nitro-octadecanol, dioleate of glycerol, etc. The polyhydric alcohols preferably contain from 2 to about 10 hydroxy radicals and include, for example, ethylene glycol, diethylene glycol, triethylene glycol, tetraethylene glycol, dipropylene glycol, tripropylene glycol, dibutylene glycol, tributylene glycol and other alkylene glycols in which the alkylene radical contains from 2 to about 8 carbon atoms. Other polyhydric alcohols include glycerol, mono-oleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, xylene glycol, etc. The carbohydrates that may be used may be exemplified by the sugars, starches, celluloses, etc., such as glucose, fructose, sucrose, rhamnose, mannose, glyceraldehyde and galactose.

An especially preferred class of polyhydric alcohols are those having at least three hydroxy radicals, some of which have been esterified with a monocarboxylic acid having from about 8 to about 30 carbon atoms such as octanoic acid, oleic acid, stearic acid, linoleic acid, dodecanoic acid, or tall oil acid. Examples of the partially esterified, polyhydric alcohols are the mono-oleate of sorbitol, distearate of sorbitol, mono-oleate of glycerol, monostearate of glycerol, di-dodecanoate of erythtritol, etc. The esters may be derived also from the unsaturated alcohols such as allyl alcohol, cinnamyl alcohol, propargyl alcohol, 1-cyclohexene-3-ol, an oleyl alcohol. Still other classes of alcohols capable of yielding esters of this invention comprise the ether-alcohols and amino-alcohols including, for example, the oxy-alkylene-, oxy-arylene-, amino-alkylene-, and amino-arylene-substituted alcohols having one or more oxy-alkylene, amino-alkylene or amino-arylene oxy-arylene radicals, They are exemplified by Cellosolve, carbitol, phenoxyethanol, heptylphenyl-(oxypropylene)$_6$ - H, octyl - (oxyethylene)$_{30}$-H, phenyl-(oxyoctylene)$_2$ - H, mono(heptylphenyl-oxypropylene)-substituted glycerol, poly(styrene oxide), amino-ethanol, 3-amino ethylpentanol, di(hydroxyethyl)amine, p-aminophenol, tri(hydroxypropyl)amine, N-hydroxyethyl ethylene diamine, N,N,N',N'-tetrahydroxytrimethylene diamine, and the like. For the most part, the ether-alcohols having up to about 150 oxyalkylene radicals in which the alkylene radical contains from 1 to about 8 carbon atoms are preferred.

The esters of this invention may be prepared by one of several methods. The method which is preferred because of convenience and superior properties of the esters it produces, involves the reaction of a suitable alcohol or phenol with a substantially hydrocarbon-substituted succinic acid or its derivative. The relative proportion of the carboxylic acid or derivative and the hydroxy reactant depends to a large measure upon the type of the product desired and the number of hydroxyl groups present in the molecule of the hydroxy reactant. For instance, the formation of a half ester of a succinic acid, i.e., in which only one of the two acid radicals is esterified, involves the use of one mole of a monohydric alcohol for each mole of the substituted succinic acid reactant; whereas the formation of a diester of a succinic acid invloves the use of 2 moles of the monohydric alcohol for each mole of the acid. On the other hand, 1 mole of a hexahydric alcohol may combine with as many as 6 moles of a succinic acid to form an ester in which each of the 6 hydroxyl radicals of the alcohol is esterified with one of the two acid radicals of the succinic acid. Thus, the maximum proportion of the succinic acid to be used with a polyhydric alcohol is determined by the number of hydroxyl groups present in the molecule of the hydroxy reactant. In some instances, it is advantageous to carry out the esterification in the presence of a catalyst such as sulfuric acid, pyridine hydrochloride, hydrochloric acid, benzene sulfonic acid, p-toluene sulfonic acid, phosphoric acid, or any other known esterification catalyst. The amount of the catalyst in the reaction may be as little as 0.01% (by weight of the reaction mixture), and more often from about 0.1% to about 5%. A more specific illustration of preparing the esters may be found in U.S. Pat. 3,381,022; the disclosure of which is hereby incorporated by reference.

The following examples illustrate the process and products of this invention.

EXAMPLE 1

A mixture (in a reaction vessel equipped with reflux apparatus) comprising 420 parts by weight of chlorinated polyisobutylene (prepared by chlorinating polyisobutylene having an average molecular weight of about 900 to a chlorine content of 4.2%) and 54 parts of 3-chloropropanoic acid are heated to 200° C. and maintained at 197°–205° C. for 3.25 hrs. while blowing nitrogen through the mixture. While continuing the nitrogen blowing, the mixture is heated an additional 1.5 hrs. at 225° C., cooled to 170° C., and stripped to 205° C. at a pressure of 18 mm. (Hg). The residue remaining after the stripping operation contains a high molecular weight carboxylic composition which may be characterized as having a chlorine content of 0.66% and a neutralization number (phenophthalein) of 33 (acid).

EXAMPLE 2

The procedure of Example 1 is repeated except that the amount of 3-chloropropanoic acid utilized is increased to 108 parts by weight. The stripped residue contains a high molecular weight carboxylic composition which may be characterized as having a chlorine content of 0.59% and a neutralization number (phenophthalein) of 43 (acid).

EXAMPLE 3

A high molecular weight carboxylic composition prepared as in Example 1, is reacted with sorbitol at a temperature of 150° C. utilizing an equivalent ratio of the carboxqylic composition to sorbitol of 1:3. The reaction product is a mixture of esters of sorbitol.

EXAMPLE 4

A high molecular weight carboxylic composition prepared according to the process of Example 2 is reacted with a commercial mixture of ethylene polyamines at 145°–155° C. to produce a mixture of acylated alkylene polyamines. The equivalent ratio of the high molecular weight carboxylic composition to the alkylene polyamine mixture is 1:2.

EXAMPLE 5

A reaction vessel equipped with a reflux condenser and containing 523 parts by weight of the chlorinated polyisobutylene described in Example 1 is heated to 120° C. At that point, the drop-wise addition of 86 parts by weight of chloroacetyl chloride is begun. The reaction mixture is heated to 165°–196° C. for 4 hours while the drop-wise addition of chloroacetyl chloride continues. After the addition of all the chloroacetyl chloride, the reaction mixture is heated to 230° C. and then allowed to stand without heating for about 16 hours. The resulting mixture is stripped to 240° C. at 20 mm. (Hg). The stripped material contains the desired high molecular weight carboxylic acid chloride in unreacted polyisobutylene and is characterized by having a chlorine content of 1.25% and a neturalization number (phenophthalein) of 5.7 (acid).

EXAMPLE 6

A reaction vessel equipped with a reflux condenser and containing 412 parts by weight of the chlorinated polyisobutylene described in Example 1 and 68 parts by weight of chloroacetyl chloride is heated to 85° C. at which time about 6 parts by weight of tert-butyl peroxide is added to the reaction mixture. Heating is continued until the mixture reached a temperature of 120° C. The mixture is then heated within the range of 125°–165° C. for 14 hours, during the first 7 hours of which approximately 20 parts by weight of additional tert-butyl peroxide is added drop-wise. The resulting reaction mixture is stripped to a temperature of 145° C. at 400 mm. (Hg). The stripped residue contains the desired high molecular weight carboxylic composition which is characterized as having a chlorine content of 2.23% and a neutralization number (phenophthalein) of 10.9 (acid).

EXAMPLE 7

A reaction vessel fitted with a reflux condenser and containing 618 parts by weight of the chlorinated polyisobutylene described in Example 1, 1450 parts by weight of n-decane, 254 parts by weight of chloroacetyl chloride, and 50 parts by weight of tert-butyl peroxide is heated to about 1420° C. After heating at 142°–148° C. for 4 hours, 60 parts by weight of additional tert-butyl peroxide is added. This mixture is refluxed for 2.5 hours, allowed to stand for 40 hours, and then reheated at reflux for 16 hours. The resulting reaction mixture is heated to 165° C. with nitrogen blowing for a sufficient period of time to remove unreacted chloroacetyl chloride. To this high molecular weight carboxylic acid chloride-containing product thus produced, there is added over a 2 hour period, under reflux conditions, 361 parts by weight of a commercial mixture of ethylene polyamines approximating the average composition of tetraethylene pentamine in 72 parts by weight n-decane. After the addition of the amine reactant, reflux conditions are maintained for an additional hour. Thereafter, the reaction mixture is allowed to cool and then added to a mixture of 2750 parts by weight hexane, 2000 parts by weight water, and 400 parts by weight methanol. The resulting mixture is stirred and the layers allowed to separate for 16 hours. The organic layer is separated and the hexane stripped. The inorganic layer was centrifuged and thereafter the upper layer of the inorganic layer is added to the organic material previously removed. The resulting mixture is then stripped of hexane. The decane is removed by stripping to 217° C. at 25 mm. (Hg). Fifty parts by weight of a filter aid is added to the stripped material and the product is filtered. The filtrate comprises the desired acylated-nitrogen composition characterized by a chlorine content of 0.54%, and a nitrogen content of 3.28%.

EXAMPLE 8

A mixture containing 412 parts by weight of chlorinated polyisobutylene as described in Example 1 and 100 parts by weight of the diethylester of chloromalonic acid, $ClCH(COOEt)_2$, is heated to 150° C. during which time a vigorous evolution of gas is noted. Heating is continued at 190°–210° C. for 0.5 hr. Then the temperature is elevated to 210°–220° C. for 6.5 hrs. The resulting mixture is stripped to 200° C. at 30 mm. (Hg). The stripped product contains the desired high molecular weight carboxylic acid ethyl-ester characterized by a chlorine content of 0.59% and a saponification number of 61.

EXAMPLE 9

To a reaction vessel containing 412 parts by weight of chlorinated polyisobutylene as described in Example 1 and 99 parts by weight of the diethyl ester of chloromalonic acid there is added about 5 parts by weight of tert-butyl peroxide. The resulting mixture is heated at a temperature of 150°–200° C. for 8 hours. During the first 1.5 hours, 32 parts by weight tert-butyl peroxide is added drop-wise. As the peroxide is added, the temperature drops until the final temperature is about 150° C. The resulting mixture is stripped to 220° C. at 20 mm. (Hg). The stripped material contains the desired high molecular weight carboxylic acid ethyl ester characterized by a chlorine content of 1.54% and a saponification number of 27.

EXAMPLE 10

A mixture containing 330 parts by weight of the high molecular weight carboxylic acid ethyl-ester produced according to Example 8, 25 parts by weight of pentaerythritol and 6 parts by weight of a polyoxyalkylene triol (having an average molecular weight of about 4800 prepared by reacting propylene oxide with glycerol and thereafter reacting that product with ethylene oxide to produce a product wherein —$CH_2CH_2O$— groups constitute about 18% by weight of the triol) is heated to 100° C. and thereafter one part by weight of concentrated sulfuric acid (catalyst) is added. Heating is continued at 140°–190° C. for 1.5 hrs. Thereafter, 8 parts by weight of a commercial mixture of ethylene polyamine is added to the esterification product and the resulting mixture is heated at 170°–190° C. for about 1 hour. Then, 157 parts by weight of low viscosity mineral oil and 25 parts by weight of a commercial filter aid are added and the resulting mixture filtered. The lltrate is the desired product and is a mixture of esters and acylated-nitrogen compounds characterized by a nitrogen content of 0.53%.

Following the general procedure of Example 2, the following materials are reacted to produce the high molecular weight carboxylic composition which illustrates the process and products of this invention.

TABLE

| Example number | Halogenated, aliphatic hydrocarbon reactant (A) | Low molecular weight carboxylic acid compound (B) | Molar ratio (A):(B) |
|---|---|---|---|
| 11 | Same as Example 1 | Chlorosuccinic anhydride | 1:1 |
| 12 | do | Chlorosuccinimide | 1:1.1 |
| 13 | do | N,N-diethylAmide of 2,3-dichlorobutanoic acid. | 1:1 |
| 14 | Polyisobutene (avg. mole wt. 1,000) brominated to Br content of 4.2%. | 3-chloropropionyl chloride. | 1:1.5 |
| 15 | Same as Example 1 | Methyl ester of 3-bromopropanoic acid. | 1:2 |
| 16 | do | Calcium salt of 3-chloropropanoic acid. | 1:2 |
| 17 | do | Lithium salt of 3-chloropropanoic acid. | 1:1 |
| 18 | do | Ethyl ester of 3-chloropropanoic acid. | 1:1 |
| 19 | do | Methyl ester of 3-chloropropanoic acid. | 1:1 |
| 20 | do | Amide of 3-chloropentanoic acid. | 1:1 |

The carboxylic composition of this invention can be effectively employed in a variety of lubricating compositions. The lubricating compositions include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and various other lubricating oils and greases can benefit from the incorporation of these carboxylic compositions.

More specifically, the high molecular weight carboxylic compositions of this invention, e.g., particularly the esters, salts and acylated-nitrogen compositions as described hereinabove, may be employed in effective amounts as additives. For example, the carboxylic compositions may be used as a dispersant in an oleaginous material, including, for example, the synthetic and mineral lubricating oils, the normally-liquid fuels, e.g., gasoline, diesel fuels, kerosene, etc., in an amount ranging from about 0.0001 to about 25% by weight of the composition. Preferably, the carboxylic composition may be used, e.g., as a dispersant, in amounts ranging from about 0.01 to 15% and more preferably in amounts ranging from about 0.1 to 10% by weight of the total composition. The optimum amount added to a particular oleaginous material depends upon the particular type of surface or the conditions to which the fuel or lubricant is to be subjected. For example, if the carboxylic composition of this invention is to be added to a gasoline for an internal combustion engine the amount may range from about 0.0001 to about 1.0% by weight. If however, the composition is to be added to a gear lube or used in a diesl engine, etc., the amount may range as high as 25% by weight of the total composition. In some instances, even larger percentages, e.g., up to about 30% by weight of the carboxylic composition may be utilized depending upon the particular use of the lubricant or fuel.

The following illustrate the oleaginous and fuel compositions of this invention.

EXAMPLE A

A blend is prepared with an SAE 10W-40 mineral lubricating oil, 1.5% by weight of the product of Example 10, 0.8% by weight of phosphorus as the adduct obtained by heating zinc dinonylphosphorodithioate with 0.25 mole of 1,2-hexene oxide at 120° C., a sulfurized-methyl ester of a tall oil acid having a sulphur content of 15%, 6% by weight of a polyisobutylene viscosity index improver having an average molecular weight of about 80,000, 0.005% by weight of a poly-(alkylmethacrylate)anti-foam agent, and 0.5% by weight of lard oil.

EXAMPLE B

A gasoline is blended with 0.001% by weight of the ester of Example 3.

EXAMPLE C

A kerosene is blended with 0.01% by weight of the acylated-nitrogen composition of Example 4.

In addition to the carboxylic compositions, e.g., dispersants of this invention, it is obvious that other known additives may be used in the fuel or lubricant. These additives include, for example, detergents of the ash-containing type, dispersants of the ashless-type, viscosity-index improving agents, pour-point depressing agents, anti-foam agents, extreme-pressure agents, rust-inhibiting agents, oxidation and corrosion inhibiting agents, and various mixtures of these materials in various proportions. More particularly, the ash-containing detergents may be illustrated by the oil soluble neutral and basic salts of the alkali or alkaline earth metals of the sulfonic acids, carboxylic acids, or the organic phosphorus acids. An additive may be prepared, for example, by the reaction of an olefin polymer, e.g., polyisobutene, having a molecular weight of about 2000 with a phosphorizing agent including, for example, phosphorus trichloride, phosphorus heptasulfide, phosphorus pentasulfide, phosphorus trichloride and sulfur, white phosphorus, and a sulfur halide or phosphorothioic chloride. The compositions most commonly used, however, are the salts of sodium, potassium, lithium, calcium, magnesium, strontium, barium and various mixtures thereof.

A method for preparing the basic salts, comprises heating a mineral oil solution of the acid with a stoichiometric excess of a metal neutralizing agent, e.g., a metal oxide, hydroxide, carbonate, bicarbonate, sulfide, etc., at temperatures above about 50° C. In addition, various promoters may be used in the neutralizing process to aid in the incorporation of the excess of metal. These promoters are presently known and include compounds as the phenolic compounds, e.g., phenols, naphthols, alkylphenols, thiophenols, sulfurized alkylphenols, and the various condensation products of formaldehyde with the phenolic compounds, e.g., alcohols such as methanol, 2-propanol, octyl alcohol, cellosolve, carbitol, ethylene glycol, stearyl alcohol and cyclohexyl alcohol; amines such as aniline, phenylene-diamine, phenothiazine, phenyl-beta-naphthylamine, and dodecyl amine, etc. A particularly effective process for preparing the basic salts comprises mixing the acid with an excess of the alkaline earth metal in the presence of the phenolic promoter and a small amount of water and carbonating the mixture at an elevated temperature, e.g., 60° C. to about 200° C.

The extreme pressure agents, corrosion-inhibiting and oxidation inhibiting agents are exemplified by the chlorinated aliphatic hydrocarbons such as chlorinated wax; organic sulfides and polysulfides such as benzyl disulfide, bis(chlorobenzyl)disulfide, dibutyl tetrasulfide, sulfurized sperm oil, sulfurized methyl ester of oleic acid, sulfurized alkylphenol, sulfurized dipentene, sulfurized terpene, etc; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl-4-pentyl-phenyl phosphite, polypropylene-(molecular weight 500)-substituted phenyl phosphite; diisobutyl substituted phenyl phosphite; metal thiocarbamates such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl) - phosphorodithioate, cadmium dinonylphosphorodithioate, the zinc salt of a phosphorodithioic acid produced by the reaction of phosphorus pentasulfide with an equimolar mixture of isopropyl alcohol and n-hexyl alcohol, etc.

The fuel or lubricating compositions may contain a metal detergent additive in amounts ranging from about 0.001% to about 15% by weight. In some applications, e.g., in lubricating marine diesel engines, the lubricating compositions may contain as much as 30% of a detergent additive. The compositions, e.g., lubricants or fuels, etc., may contain extreme pressure agents, viscosity-index improving agents, pour-point depressing agents, etc., each in amounts within the range of from about 0.001 to 15% and preferably in amounts of 0.1% to about 10%. One or more of the above-mentioned additives may be used either alone or in combination in various compositions, e.g., fuels or lubricating oils, with about 0.0001% to about 25% by weight of the carboxylic compositions of this invention.

The oleaginous materials, e.g., lubricants and fuels, include animal and vegetable oils, e.g., castor oil, lard oil, etc., as well as solvent-refined or acid-refined mineral lubricating oils of the paraffinic, naphthenic, or mixed paraffinic-naphthenic types. Oils of lubricating viscosity derived from coal or shale are useful base oils. The synthetic lubricating oils include the hydrocarbon oils and halo-substituted hydrocarbon oils such as polymerized and interpolymerized olefins (e.g., polybutylenes, propyleneisobutylene copolymers, chlorinated polybutylenes, etc.); alkyl benzenes (e.g., dodecylbenzene, tetradecyl benzene, dinonylbenzene, di-(2-ethylhexyl)benzene, etc.); polyphenyls (e.g., biphenyls, terphenyls, etc.) and the like. The alkylene oxide polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers e.g., methylpolyisopropylene glycol ether having an average molecular weight of 1000, diphenyl ether of polyethylene glycol having a molecular weight of 500 to 1000, diethyl ether of polypropylene glycol having a molecular weight of 1000 to 1500, etc. or mono- and polycarboxylic esters thereof, for example, the acetic acid esters, mixed $C_3$–$C_8$ fatty acid esters, or the $C_{13}$Oxo acid diester of tetraethylene glycol, etc.

Other synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicoxyl sebacate, the 2-ethylhexyl diester of linoleic acid dimer, the complex ester formed by reacting one mole of sebacic acid with two moles of 2-ethyl-hexanoic acid, and the like.

Silicone-based oils such as the polyalkyl-, polyaryl-, polyalkoxy-, or polyaryloxy- siloxane oils and silicate oils comprise another class of synthetic lubricants (e.g., tetraethyl-silicate, tetraisopropyl-silicate, tetra-(2 - ethylhexyl)-silicate, tetra-(4 - methyl - 2 - tetraethyl)-silicate, tetra - (p - tert - butylphenyl) - silicate, hexyl-$_1$4-methyl-2 - pentoxy) - disiloxane, poly(methyl) - disoloxanes, poly - (methyl - phenyl) - siloxanes, etc.). Other synthetic lubricants include the liquid esters of phosphorus-containing acids (e.g., tricresyl phosphate, trioctyl phosphate, diethyl ester of decane phosphonic acid, etc.), polymeric tetrahydrofurans and the like.

While this invention is described with a number of specific embodiments, it is obvious that there are other variations and modifications which can be made without departing from the spirit and scope of the invention as particularly set forth in the appended claims.

What is claimed is:

1. A process for preparing an oil-soluble, high molecular weight substantially saturated, hydrocarbon-substituted carboxylic acid composition useful as a dispersant in oleaginous materials and normally liquid fuels which comprises reacting at a temperature of at least about 80° C. one chemical equivalent of (A) at least one halogenated substantially-saturated hydrocarbon having at least about 25 aliphatic carbon atoms wherein the halogen is present in the amount of at least about 1.0 atomic proportion of halogen per molecule to about 1.0 atomic proportion of halogen for every 25 aliphatic carbon atoms in said hydrocarbon with at least about 1.0 chemical equivalents of (B) at least one low molecular weight, alpha or beta halogenated saturated-aliphatic carboxylic acid or a derivative thereof containing up to about twelve carbon atoms in the acyl group.

2. The process of claim 1 further characterized in that the low molecular weight alpha or beta halogenated saturated-aliphatic carboxylic acid derivative is an acid or anhydride.

3. The process of claim 2 further characterized in that the mono- or polycarboxylic acid or the anhydride thereof is reacted with at least one amine to obtain the corresponding high molecular weight substantially saturated, hydrocarbon-substituted amide, imide, amidine and salt.

4. The process of claim 3 further characterized in that the amine is an aliphatic polyamine.

5. The process of claim 2 further characterized in that the mono- or polycarboxylic acid or the anhydride thereof is reacted with at least one hydroxy compound to obtain the corresponding high molecular weight substantially saturated, hydrocarbon-substituted carboxylic ester.

6. The process of claim 5 further characterized in that the hydroxy compound is an aliphatic polyhydroxy alcohol.

7. The process of claim 2 further characterized in that the mono-or polycarboxylic acid or the anhydride thereof is reacted with at least one metal or metal compound to obtain the corresponding high molecular weight substantially saturated, hydrocarbon-substituted carboxylic metal salt.

8. The process of claim 7 further characterized in that the metal compound is an alkali or alkaline earth metal compound.

9. The process of claim 1 further characterized in that the reaction takes place in the presence of a substantially-inert organic liquid.

10. The process of claim 1 further characterized in that the reaction temperature ranges from about 100° C. to 300° C.

11. The process of claim 1 further characterized in that the halogenated substantially-saturated hydrocarbon has at least 50 aliphatic carbon atoms.

12. The process of claim 11 further characterized in that said halogen is present in the amount of at least about 1.0 atomic proportion of halogen for every 50 carbon atoms.

13. The process of claim 1 further characterized in that the low molecular weight carboxylic acid or the derivative thereof is present in the amount of at least about 1.0 equivalent for each equivalent of the halogenated hydrocarbon.

14. The process of claim 13 further characterized in that the halogenated hydrocarbon has an average of about 1.0 atomic proportion of halogen for every 25 aliphatic carbon atoms.

15. The process of claim 1 further characterized in that the low molecular weight, alpha or beta halogenated saturated-aliphatic carboxylic-acid derivative has up to 12 carbon atoms in the acyl moiety and is selected from the class consisting of the anhydrides, halides, esters, salts, amides, imides, and amidines.

16. The process of claim 15 further characterized in that low molecular weight, alpha or beta halogenated saturated-aliphatic carboxylic-acid derivative is a polycarboxylic-acid derivative.

17. The process of claim 15 further characterized in that the low molecular weight, alpha or beta halogenated saturated-aliphatic carboxylic-acid derivative is a monocarboxylic-acid derivative.

18. The process of claim 16 further characterized in that the low molecular weight, alpha or beta halogenated saturated-aliphatic polycarboxlic-acid derivative is a halogenated succinic-acid derivative.

19. The process of claim 17 further characterized in that the low molecular weight, alpha or beta halogenated saturated-aliphatic carboxylic-acid derivative is a halogenated alkanoic-acid derivative.

20. The process of claim 19 further characterized in that the halogenated alkanoic-acid derivative is a chlorinated propanoic-acid derivative and the halogenated substantially-saturated hydrocarbon is a chlorinated polyisobutylene.

21. The process of claim 19 further characterized in that the halogenated alkanoic-acid derivative is a chlorinated propanoic-acid halide.

22. The process of claim 15 further characterized in that the low molecular weight, alpha or beta halogenated saturated-aliphatic carboxylic-acid derivative is a salt.

23. The process of claim 1 further characterized in that the halogenated substantially-saturated hydrocarbon is a halogenated polymer of a monoolefin having an average molecular weight ranging from about 300 to 10,000.

24. The process of claim 23 further characterized in that the polymer has an average molecular weight ranging from about 700 to 5000.

25. The process of claim 23 further characterized in that the halogenated substantially-saturated hydrocarbon is a chlorinated polyolefin and the low molecular weight alpha or beta halogenated saturated-aliphatic carboxylic acid is a chlorinated carboxylic acid or a derivative thereof.

26. The process of claim 23 further characterized in that the low molecular weight, saturated-aliphatic carboxylic acid is a beta-chloronated carboxylic acid or a derivative thereof.

27. The process of claim 23 further characterized in that the halogenated polymer is a chlorinated polymer selected from the class consisting of chlorinted polyisobutylene, chlorinated polypropylene, chlorinated polyethylene and chlorinated ethylene-propylene copolymers.

28. The product obtained by the process of claim 1.
29. The product obtained by the process of claim 3.
30. The product obtained by the process of claim 5.
31. The product obtained by the process of claim 7.
32. The product obtained by the process of claim 15.
33. The product obtained by the process of claim 16.
34. The product obtained by the process of claim 17.

References Cited
UNITED STATES PATENTS

| | | | |
|---|---|---|---|
| 3,454,607 | 7/1969 | Lesuer et al. | 260—408 |
| 3,219,666 | 11/1965 | Norman et al. | 260—268 |
| 3,205,185 | 9/1965 | Lessells et al. | 260—23 |
| 3,522,179 | 7/1970 | Lesuer | 252—51.5 |
| 3,542,678 | 11/1970 | Bork | 252—51.5 |
| 3,281,356 | 10/1966 | Coleman | 252—32.7 |
| 3,579,486 | 5/1971 | McConnell et al. | 260—78.4 |
| 3,340,281 | 9/1967 | Brannen | 260—404.5 |
| 3,639,242 | 2/1972 | Lesuer | 252—56 R |
| 3,452,089 | 6/1969 | Long | 260—539 |

JOSEPH L. SCHOFER, Primary Examiner

J. KNIGHT III, Assistant Examiner

U.S. Cl. X.R.

208—18; 252—56 R, D, 58; 260—249.6, 268 R, 404, 404.5, 408, 410